INVENTOR.
GUILLAUME LE GOFF

June 3, 1969  G. LE GOFF  3,448,372
APPARATUS FOR REDUCING THE SWITCHING TIME OF
A DUAL VOLTAGE POWER SUPPLY
Filed Oct. 17, 1966

INVENTOR.
GUILLAUME LE GOFF
BY
*Frank R. ...*
AGENT

United States Patent Office 3,448,372
Patented June 3, 1969

3,448,372
APPARATUS FOR REDUCING THE SWITCHING
TIME OF A DUAL VOLTAGE POWER SUPPLY
Guillaume Le Goff, Calvados, France, assignor to U.S.
 Philips Corporation, New York, N.Y., a corporation of
 Delaware
Filed Oct. 17, 1966, Ser. No. 587,327
Claims priority, application France, Oct. 18, 1965,
35,336
Int. Cl. G05f 5/00
U.S. Cl. 323—22                      13 Claims

ABSTRACT OF THE DISCLOSURE

A voltage regulator that selectively supplies two discrete values of regulated voltage to a load. The regulator includes a negative feedback circuit having a given RC time constant that limits the circuit response time when it is switched between the two values of output voltage. A pair of complementary transistors, normally biased "off," are coupled to the feedback circuit so as not to effect the normal regulator action. However, during the switch-over period, one or the other of the transistors is turned "on" and operates to reduce the RC time constant of the feedback circuit by effectively short-circuiting a portion of the resistance thereof.

The present invention relates to a stabilizing device adapted to supply a voltage of a value selected from at least two predetermined values. A device of this type generally comprises an electronic stabilizing element connected in series between the unregulated input voltage and the regulated output voltage. By means of a negative feedback circuit, a voltage, proportional to the difference between a selected fraction of said regulated voltage and a selected fixed reference voltage, is applied to a control electrode of the stabilizing element.

It is known that voltage stabilizing devices provide supply sources whose internal resistance is negligible in normal operation, as compared with the resistance of the load circuit. The magnitude of the output voltage of such a device may be readily adjusted to various values, for example, by comparing a fraction of the output voltage with various sources of fixed reference voltages. The result of said comparison is applied to the control-electrode of a stabilizing tube or transistor in order to obtain a stable value of the momentarily desired voltage.

The successively obtained stable values may be applied, for example, to electronic active or passive components so that the characteristics thereof can be measured. Automatic devices are already known which allow the performance of such measurements at a high rate. However, this rate is limited by the relatively long time required by stabilizing arrangements comprising electron tubes or transistors to pass from one voltage value to another, since the negative feedback circuit included between the output of the device and the stabilizing tube or transistor comprises a damping circuit. The damping circuit is usually formed by an RC integrating network which serves to prevent the devices from oscillating. This network has, however, the disadvantage of introducing a large time constant in the control loop.

The present invention mitigates this disadvantage. For this purpose, the voltage stabilizing device according to the invention comprises means blocked in normal operation and adapted to modify rapidly the charge of the capacitor of said integrating network when a new value of said stabilized voltage is being selected.

Said means blocked in normal operation preferably comprise two transistors of complementary types biased so that they are normally cut off. The base of one transistor is connected to the base of the other and one of the two other electrodes of one transistor is connected to the corresponding electrode of the other. The junction of said bases is connected to one of the terminals of the resistor of the integrating network, whereas the junction of the two further interconnected electrodes is connected to the other terminal of said resistor.

When an abrupt variation of the reference voltage occurs, a strong disequilibrium is produced in the control-circuit so that, depending upon the direction of the variation, one or the other transistor becomes conducting during the major part of the change-over period. The reduction of the change-over period of the stabilizing circuit due to the conduction of the transistor is due to an accelerated charging or discharging of the damping capacitor.

As a matter of course, said invention may also be applied to stabilizing circuits designed for supplying more than two voltage values and to rectifying circuits equipped with a "constant current" stabilizing circuit.

The invention will now be described more fully with reference to the accompanying drawing, in which.

Figure 1:
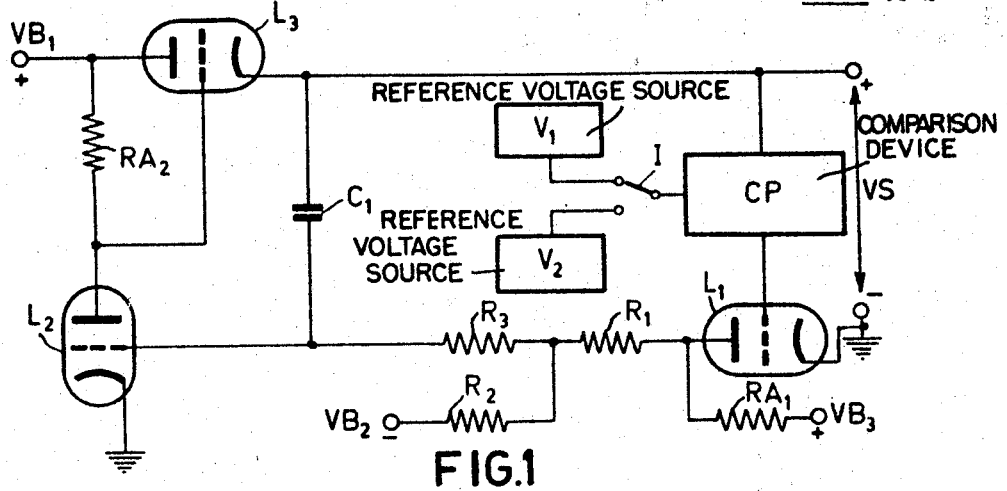
FIG. 1 shows the basic diagram of a prior at voltage stabilizing device comprising electron tubes.

The voltage stabilizing device shown in FIG. 1 comprises an electronic amplifying tube $L_1$ having a control grid which receives a voltage from comparison member CP that results from the comparison of the output voltage VS of the device with one of the reference voltages $V_1$ and $V_2$, selected by means of a switch I. Comparison member CP may comprise a differential amplifier. The anode of the tube $L_1$ is connected to the positive terminal $VB_3$ through the resistor $RA_1$, and is coupled with the grid of a second amplifying tube $L_2$ through an integrating network comprising resistors $R_1$, $R_2$, a damping resistor $R_3$ and a damping capacitor $C_1$. The resistors $R_1$ and $R_3$ are connected in series between the anode of $L_1$ and the grid of $L_2$, whereas $R_2$ is connected to the junction of $R_1$ and $R_3$ and to the negative terminal $VB_2$ of a voltage source. The positive terminal of voltage source $VB_2$ is grounded. The anode of tube $L_2$ is energized from the positive terminal $VB_1$ through a resistor $RA_2$, and is connected to the grid of a series-connected regulator tube $L_3$. The anode of tube $L_3$ also receives the unstabilized voltage $VB_1$ and the cathode forms the positive terminal for the stabilized voltage VS. The capacitor $C_1$ is connected between this cathode and the grid of tube $L_2$. The time constant of the integrating network is thus approximately equal to $$C_1\left(R_3+\frac{R_1R_2}{R_1+R_2}\right)$$

Such a device operates as follows: A fraction $\beta VS$ of the stabilized voltage VS is compared in the comparison member CP with an absolutely fixed reference voltage $V_1$ (or $V_2$), supplied by a standard battery, a set of dry battery-elements or, for example, a neon tube. The comparison member CP provides at its output (the grid of the tube $L_1$) a voltage which, subsequent to amplification by the tubes $L_1$ and $L_2$, is equal to $-K(\beta VS-V_1)$, wherein K is the voltage gain of tubes $L_1$ and $L_2$. This amplified voltage is applied to the grid of tube $L_3$ connected in series between the unstabilized voltage $VB_1$ and the stabilized output voltage VS. An increase $\Delta VS$ of VS produces a diminution of $-K\beta\Delta VS$ of the grid potential of the tube $L_3$, so that the difference potential between the anode and the cathode of this tube is raised. The voltage VS thus is stabilized. The integrating network $R_1$, $R_2$, $R_3$ and $C_1$ prevents the device from oscillating. However, such an integrating network has a time constant $$C_1\left(R_3+\frac{R_1R_2}{R_1+R_2}\right)$$

which prevents the stabilized voltage VS from passing rapidly from the value VS corresponding to the position $V_1$ of the selector-switch I to the value corresponding to the position $V_2$ of said switch or reversely.

Figure 2:
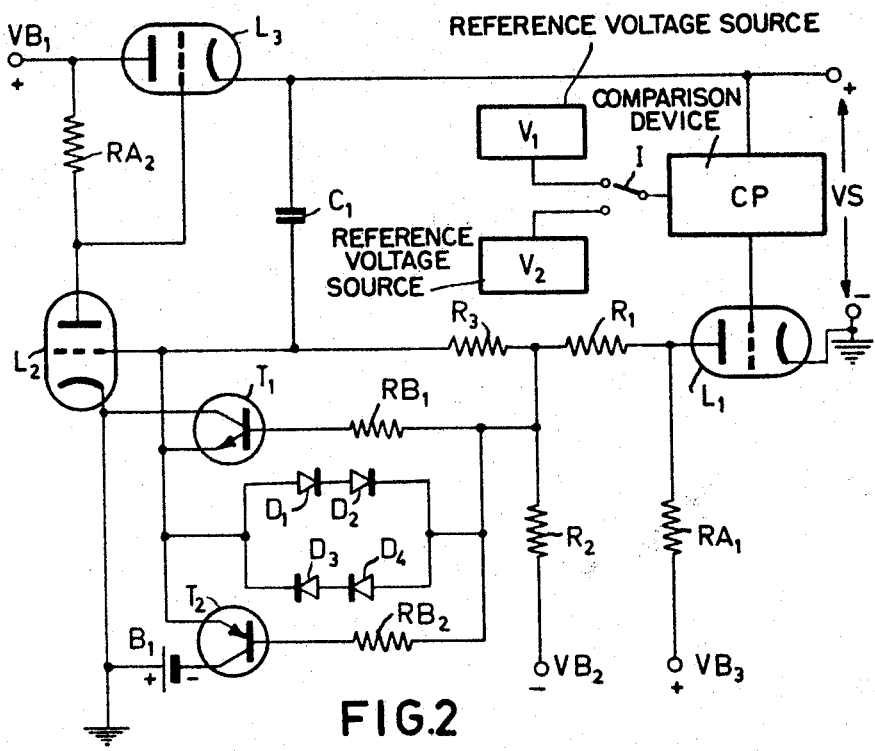
FIG. 2 shows the device of FIG. 1 improved according to the invention.

In order to obviate this disadvantage, the device is improved according to the invention, as shown in FIG. 2, by providing it with a circuit including transistors $T_1$ and $T_2$ of the npn and pnp type, respectively, two resistors $RB_1$ and $RB_2$ and a voltage source $B_1$. The resistors $RB_1$ and $RB_2$ serve to limit the base current of the transistors $T_1$ and $T_2$. One of their terminals is connected to the junction of the resistors $R_1$, $R_2$ and $R_3$.

The emitters of the transistors $T_1$ and $T_2$ are connected to the junction of the resistor $R_3$, the capacitor $C_1$ and the grid of the tube $L_2$.

The collector of the transistor $T_1$ is connected to ground and that of the transistor $T_2$ is connected to the negative terminal of the voltage source $B_1$. The positive terminal of voltage source $B_1$ is connected to ground.

The transistors $T_1$ and $T_2$ are thus biased so that, in normal operation, they are not conducting. However, when a considerable disequilibrium occurs in the circuit due to the change-over of the switch I from the position $V_1$ to the position $V_2$, or conversely, the resistor $R_3$ is traversed by a current produced by the charging or the discharging of the capacitor $C_1$. This current produces across the resistor $R_3$ a potential difference which is applied between the junctions of the bases and of the emitters of the transistors $T_1$ or $T_2$. According to the direction of this potential difference, one of these transistors is rendered conducting so that resistor $R_3$ is short-circuited.

If it is assumed that $V_2$ is higher than $V_1$ and that the switch I changes over from the position $V_1$ to the position $V_2$, the charging current of the capacitor $C_1$ biases the bases of the transistors $T_1$ and $T_2$ in a negative direction with respect to their emitters. As a result, the pnp-transistor $T_2$ becomes conducting. If the switch I changes over from the position $V_2$ to the position $V_1$, the discharge current of the capacitor $C_1$ biases the bases of said transistors in a positive direction with respect to the emitters. The npn transistor $T_1$ now becomes conducting.

When one of the transistors $T_1$ or $T_2$ becomes conducting, the capacitor $C_1$ is charged by the voltage source $B_1$, or discharged to ground, according to which one of the transistors is conducting.

In both cases the resistor $R_3$ is short-circuited and the time constant of the integrating network is drastically reduced. This results in an acceleration of the change-over from one value of the output voltage VS to another value.

If the differences between the voltages $V_1$ and $V_2$ are considerable, it may be necessary to protect the base-emitter junctions of the transistors $T_1$ and $T_2$ against break-down. This is achieved by means of two groups of series-connected silicon diodes arranged in antiparallel between the junction of the resistors $RB_1$ and $RB_2$ and the emitters of the transistors $T_1$ and $T_2$.

The following components were used in a practical embodiment of the described arrangement according to the invention:

$T_1$ ---------------------------------------- 2N 1564
$T_2$ ---------------------------------------- BCZ 11
$RB_1$, $RB_2$ ----------------------------- ohms-- 22K
$D_1$–$D_4$ -------------------------------- OA 202

Figure 3:
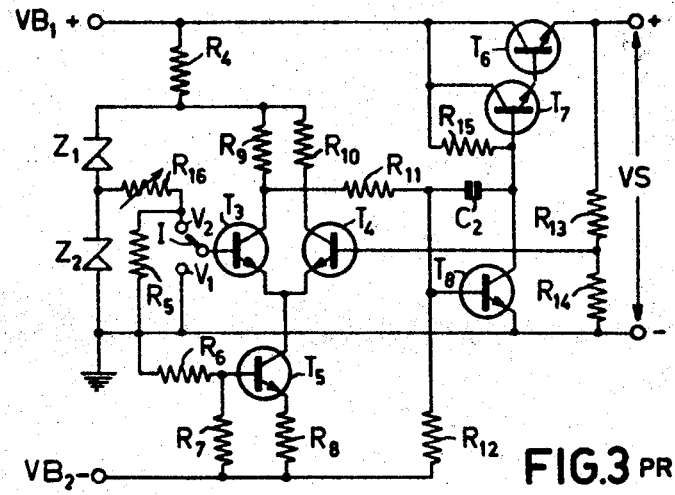
FIG. 3 shows the basic diagram of a prior art voltage stabilizing device comprising transistors.

The voltage stabilizer shown in FIG. 3 comprises a transistor $T_3$ of the npn-type, which supplies a collector current resulting from the comparison of the output voltage VS, a fraction of which is applied to the base of a transistor $T_4$, to one of the reference voltages $V_1$ or $V_2$, stabilized by one of the Zener diodes $Z_1$ and $Z_2$ and applied to the base of the transistor $T_3$. The collector-emitter path of a transistor $T_5$ constitutes a high dynamic load resistance for the interconnected emitters of the transistors $T_3$ and $T_4$, so that a moderate negative voltage can be used for the source $VB_2$. The collector of $T_3$ is coupled with the base of an amplifier transistor $T_8$ through an integrating network formed by resistors $R_{11}$ and $R_{12}$, and a damping capacitor $C_2$. The collector of $T_8$ is directly connected to the base of a transistor $T_7$. The emitter of transistor $T_7$ is connected to the base of a transistor $T_6$. The collector of transistor $T_6$ receives the unstabilized voltage $VB_1$ and its emitter forms the positive terminal of the stabilized voltage VS. The operation of this arrangement is similar to that of the arrangement shown in FIG. 1. The result of the comparison of a fraction of the output voltage VS with a reference voltage $V_1$ or $V_2$ (selected by the switch I) is applied, subsequent to amplification, to the control-electrode of the transistor $T_6$, connected in series between the unstabilized voltage $VB_1$ and the voltage VS. The negative feedback circuit includes the integrating network $R_{11}$, $R_{12}$ and $C_2$.

Figure 4:
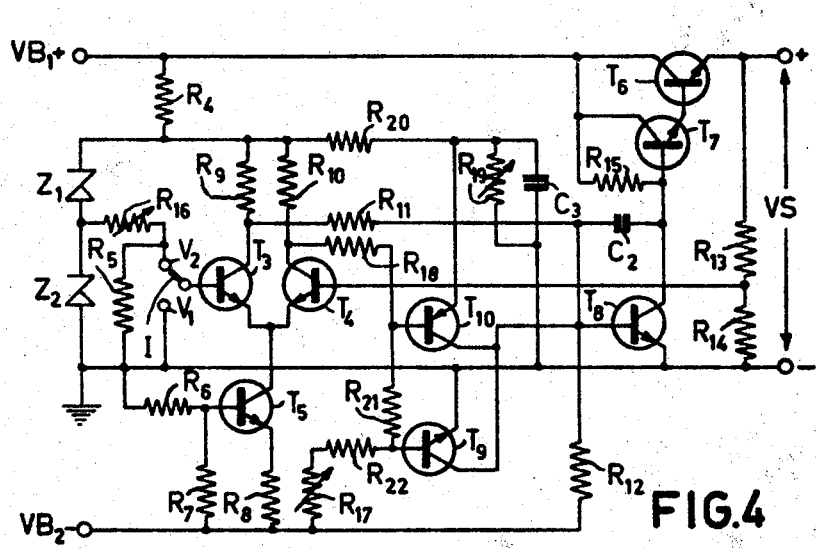
FIG. 4 shows the device of FIG. 3 improved in accordance with the invention.

In order to reduce the charge or discharge time of the capacitor $C_2$, a circuit according to the invention (see FIG. 4) and comprising transistors $T_9$ and $T_{10}$ of the npn and pnp type, respectively, biasing resistors $R_{17}$, $R_{18}$, $R_{19}$, $R_{20}$, $R_{21}$, $R_{22}$ and a capacitor $C_3$ is added to the arrangement. The collectors of the transistors $T_9$ and $T_{10}$ are connected to each other and to the base of the amplifier transistor $T_8$, whereas their bases are interconnected by means of the resistor $R_{21}$. The base of $T_{10}$ is moreover connected to the collector of $T_4$ by means of the resistor $R_{18}$. The base of $T_9$ is also connected to the source $VB_2$ via the resistors $R_{22}$ and $R_{17}$ connected in series. The emitter of $T_9$ is connected to ground and that of $T_{10}$ is connected to the junction of the resistors $R_9$ and $R_{10}$ of the collector-circuits of $T_3$ and $T_4$ through the resistor $R_{20}$. The capacitor $C_3$, shunted by the variable resistor $R_{19}$, connects the emitter of $T_{10}$ to that of $T_8$, which is directly connected to the emitter of $T_9$. The adjustable resistors $R_{17}$ and $R_{19}$ permit an accurate control of the threshold of this circuitry irrespective of discrepancies between the characteristics of the components. As in the preceding embodiment, a considerable disequilibrium in the control-circuit is produced by an abrupt variation of the reference voltage. This gives rise to a variation of the collector voltage of $T_4$ which, according to the direction of the variation, causes either the transistor $T_9$ or $T_{10}$ to become conducting, so that $C_2$ is rapidly charged through $T_9$ or rapidly discharged through $T_{10}$. In both cases the change-over period between two different values of the output voltage VS is considerably reduced.

The following components were used in a practical embodiment of the described arrangement according to the invention:

| | |
|---|---:|
| $T_3, T_4, T_5, T_7, T_8, T_9$ | BSX 21 |
| $T_6$ | 2N 1613 |
| $T_{10}$ | 2N 711A |
| $Z_1$ | BZY 69 |
| $Z_2$ | BZY 59 |
| $R_4$ ohms | 560 |
| $R_5, R_7, R_{13}$ ohms | 4.7K |
| $R_6, R_{14}$ do | 1K |
| $R_8, R_9, R_{10}$ do | 3.3K |
| $R_{11}, R_{21}$ do | 15K |
| $R_{12}$ do | 22K |
| $R_{15}$ do | 5.6K |
| $R_{16}$ do | 1K |
| $R_{17}$ do | 5K |
| $R_{18}$ do | 5.2K |
| $R_{19}$ ohms | 500 |
| $R_{20}$ ohms | 1.8K |
| $R_{21}$ do | 6.8K |
| $C_2$ pf | 1000 |
| $C_3$ μf | 10 |
| $VB_1$ v | +35 |
| $VB_2$ v | −12 |

It will be obvious that by replacing various components by equivalent elements, numerous variations of the described embodiments are possible within the scope of this invention.

What is claimed is:

1. A voltage regulating device for selectively supplying at least two regulated output voltages that have at least two predetermined values comprising, input means connected to a source of unregulated voltage and output means for supplying said output voltages, an electronic stabilizing element connected in series between said voltage source and said output means, a source of fixed reference voltage, means for producing a control voltage proportional to the difference between a selected fraction of the regulated output voltage and a selected value of said fixed reference voltage, a negative feedback circuit including RC an integrating network for preventing the device from oscillating, means for applying said control voltage to a control electrode of said stabilizing element by means of said negative feedback circuit, and control means coupled to the capacitor of said RC integrating network and blocked in normal operation of said device and responsive to a change in the selected value of the regulated output voltage to be rendered temporarily active so as to modify rapidly the charge of the capacitor of said integrating network when a new value of said regulated voltage is selected.

2. A device as claimed in claim 1 wherein said control means comprise an NPN transistor and a PNP transistor each biased into cut-off in normal operation, means connecting the base electrode of one transistor to the base electrode of the other transistor, means connecting one of the two other electrodes of said one transistor to the corresponding electrode of the other transistor, means connecting the junction of said base electrodes to one end of the resistor of the integrating network, and means connecting the junction of the other interconnected electrodes to the other end of said resistor.

3. A device as claimed in claim 2 wherein said interconnected electrodes comprise the emitter electrodes of said transistors which are connected to the same end of the resistor of the integrating network, a source of DC voltage, means connecting the collector of the NPN transistor to ground and the collector of the PNP transistor to the negative terminal of said DC voltage source, and means connecting the positive terminal of said DC voltage source to ground.

4. A device as claimed in claim 3 wherein said control means further include two groups of series-connected diodes connected in reverse parallel between the junction of the base electrodes and the junction of the emitter electrodes of said transistors.

5. A device as claimed in claim 3 further comprising current limiting resistors individually connected in the base circuits of the transistors.

6. A device as claimed in claim 1 wherein said control means comprises a pair of complementary NPN and PNP transistors each biased into cut-off in normal operation, said control voltage producing means including a third transistor having a base electrode to which is applied said fraction of the output voltage of the device, means connecting the base electrodes of said NPN and PNP transistors together to the collector electrode of the third transistor, and means connecting the collector electrodes of said NPN and PNP transistors together to one end of the resistor of said integrating network.

7. A device as claimed in claim 6 wherein said electronic stabilizing element comprises a regulator transistor, said feedback circuit further comprising an amplifier transistor having a base electrode connected to the collectors of the NPN and PNP transistors, and means connecting the output of the amplifier transistor to the control electrode of said regulator transistor for controlling the current flow thereof.

8. A device as claimed in claim 7 further comprising, means directly connecting the emitter of one of said complementary transistors to the emitter of the amplifier transistor, and means connecting the emitter of the other transistor of complementary type to the emitter of the amplifier transistor by means of a coupling capacitor.

9. A device as claimed in claim 8 further comprising an adjustable resistor connected in shunt with said coupling capacitor.

10. A device as claimed in claim 6 further comprising means connecting the collector of the third transistor through a common resistor to the base of one of said transistors of complementary type, a resistor interconnected between the base electrodes of the two complementary transistors, an auxiliary voltage source, an adjustable resistor, and means connecting the base of the other one of said complementary transistors to one terminal of said auxiliary voltage source by means of said adjustable resistor.

11. A voltage regulator circuit for selectively supplying to a load at least two discrete regulated output voltages from a single source of unregulated voltage comprising, a current regulator element connected in series between said unregulated voltage source and said load, a feedback control loop interconnecting the output of the regulator circuit with a control electrode of said current regulator element, said feedback loop including a resistor-capacitor network having a given RC time constant, means for switching said regulator circuit between said two discrete output voltages, control means biased off in normal operation of the regulator and responsive to a transient voltage produced during the switch-over period that turns on the control means, and means coupling said control means to said resistor-capacitor network so that the RC time constant thereof is reduced during the time said control means is turned on.

12. A regulator circuit as claimed in claim 11 wherein said control means comprises a pair of complementary type transistors each normally biased into cut-off, and means connecting said transistors in circuit so that a first one of said transistors is turned on when the output voltage is switched from a first discrete voltage level to a second discrete voltage level and the second one of said transistors is turned on when the output voltage is switched from said second discrete voltage level to said first discrete voltage level.

13. A regulator circuit as claimed in claim 11 wherein said feedback loop includes a comparison device having a first input coupled to the regulated output voltage and a second input, a source of reference voltage having at least two selectable values of voltage, and wherein said switching means interconnects said reference voltage source with the second input of said comparison device so that either of said two values of reference voltage can be selectively applied to said second input, and means including said resistor-capacitor network for coupling the output of said comparison device to the control electrode of said current regulator element.

References Cited

UNITED STATES PATENTS

| | | | |
|---|---|---|---|
| 2,632,143 | 3/1953 | Goodwin | 321—18 |
| 3,311,813 | 3/1967 | Sutcliffe | 323—4 |
| 3,343,060 | 9/1967 | Ingraham | 321—18 X |

JOHN F. COUCH, *Primary Examiner.*

A. D. PELLINEN, *Assistant Examiner.*

U.S. Cl. X.R.

323—38, 39